United States Patent
Young et al.

(10) Patent No.: US 11,840,399 B2
(45) Date of Patent: Dec. 12, 2023

(54) GAS BLANKETING MANAGEMENT OF LOW-PRESSURE HYDROCARBON TANKS

(71) Applicants: Gregory E. Young, Prescott Valley, AZ (US); Zane A. Miller, Loganville, GA (US)

(72) Inventors: Gregory E. Young, Prescott Valley, AZ (US); Zane A. Miller, Loganville, GA (US)

(73) Assignee: TERRA PRIMORIS HOLDINGS, L.L.C., Prescott Valley, AZ (US)

( * ) Notice: Subject to any disclaimer, the term of this patent is extended or adjusted under 35 U.S.C. 154(b) by 410 days.

(21) Appl. No.: 17/094,333

(22) Filed: Nov. 10, 2020

(65) Prior Publication Data

US 2021/0053755 A1    Feb. 25, 2021

Related U.S. Application Data

(60) Division of application No. 16/563,513, filed on Sep. 6, 2019, now Pat. No. 11,498,755, and a division of
(Continued)

(51) Int. Cl.
*B65D 90/44* (2006.01)
*C23F 11/02* (2006.01)
(Continued)

(52) U.S. Cl.
CPC ............ *B65D 90/44* (2013.01); *B65D 81/26* (2013.01); *B65D 88/76* (2013.01); *C23F 11/00* (2013.01); *C23F 11/02* (2013.01); *C23F 15/00* (2013.01); *F17C 3/10* (2013.01); *F17C 3/12* (2013.01); *B64F 1/28* (2013.01); *F17C 3/022* (2013.01); *F17C 2205/0329* (2013.01); *Y02A 20/00* (2018.01)

(58) Field of Classification Search
CPC ........ B65D 90/44; B65D 88/76; B64D 37/32; G01M 3/32; G01M 3/3272
See application file for complete search history.

(56) References Cited

U.S. PATENT DOCUMENTS 2,889,955 A    6/1959    Naulty et al.
3,935,957 A    2/1976    Tasegawa
(Continued)

FOREIGN PATENT DOCUMENTS

AU    2011213708    9/2011
CN    203408423 U    1/2014
(Continued)

*Primary Examiner* — Timothy P. Kelly
(74) *Attorney, Agent, or Firm* — BYCER & MARION, PLC; Matthew L. Bycer; Michael B. Marion

(57) ABSTRACT

A hydrocarbon tank system environment corrosion inhibitor includes use of inert gas, preferably Nitrogen, to blanket ullage and interstice through the tank system. Blanket gas is provided is controller into coupling to access ullages. Blanket gas is provided upon fueling events to stabilize the pressure in the system and prevent entry of atmospheric air and water (vapor). Blanket gas may be continuously run into the ullage and/or other spaces in tank system. A controlled system allows for monitoring of pressures in the tank, and thereby identifies pressure events and even leaks in system due to unusual events, or general loss of pressure.

20 Claims, 9 Drawing Sheets

Related U.S. Application Data application No. 15/825,038, filed on Nov. 28, 2017, now Pat. No. 10,829,298, and a continuation-in-part of application No. PCT/US2016/034900, filed on May 28, 2016.

(51) Int. Cl.
*B65D 81/26* (2006.01)
*C23F 11/00* (2006.01)
*C23F 15/00* (2006.01)
*B65D 88/76* (2006.01)
*F17C 3/10* (2006.01)
*F17C 3/12* (2006.01)
*B64F 1/28* (2006.01)
*F17C 3/02* (2006.01)

(56) References Cited

U.S. PATENT DOCUMENTS

| | | |
|---|---|---|
| 4,110,947 A | 9/1978 | Murray et al. |
| 4,378,920 A | 4/1983 | Runnels et al. |
| 5,295,391 A * | 3/1994 | Mastandrea ........ G01M 3/3254 73/49.2 |
| 5,668,308 A * | 9/1997 | Denby ................ G01M 3/3236 73/49.2 |
| 5,979,481 A | 11/1999 | Ayresman |
| 6,152,192 A | 11/2000 | Klotz et al. |
| 6,581,694 B2 | 6/2003 | Golner et al. |
| 2002/0084080 A1 | 7/2002 | Golner et al. |
| 2007/0138031 A1 | 6/2007 | Miksic et al. |

FOREIGN PATENT DOCUMENTS

| | | |
|---|---|---|
| GB | 826965 | 1/1960 |
| JP | 109493 A | 1/1998 |
| WO | WO 03/046422 A1 | 6/2003 |

* cited by examiner

GAS BLANKETING MANAGEMENT OF LOW-PRESSURE HYDROCARBON TANKS

CLAIM OF PRIORITY

The present divisional application includes subject matter disclosed in and claims priority to U.S. patent application Ser. No. 15/825,038 filed Nov. 28, 2017, issued as U.S. Pat. No. 10,829,298, entitled "Gas Blanketing System for Low-Pressure Hydrocarbon Tanks", incorporated herein by reference, and also PCT application entitled "Gas Blanketing System for Low-Pressure Hydrocarbon Tanks" filed May 2, 2016, assigned Serial No. PCT/US16/34900; U.S. patent application Ser. No. 16/563,513 filed Sep. 6, 2019, provisional application Ser. No. 62/167,522, filed May 28, 2015, and provisional application Ser. No. 62/175,705, filed Jun. 15, 2015, all incorporated herein by reference, and describing inventions made by the present inventors.

FIELD OF THE INVENTION

The present invention relates to maintenance of gas blanketed hydrocarbon tank systems. The present invention more particularly relates to a system and method of blanketing gas over hydrocarbon fuel within as low pressure small underground storage tank to resist corrosion in the tank system.

BACKGROUND OF THE INVENTION

Small and medium size (typically thought of as 50,000 and less gallons) underground and aboveground storage tanks, both steel and fiberglass, are normally used to store and dispense petroleum hydrocarbon products from a wide range of facilities. Some of the most common hydrocarbon products are diesel and gasoline. These tanks are often at retail gasoline stations.

The genesis of this invention and the proposed use at retail sites is the unusual corrosion (hereafter considered as aggressive corrosion) that has been documented in many instances over the last several years. Since the use of alcohols being added to gasoline products became more widespread, there has been a sensitivity to reduce water infiltration/mixing with gasohol (also referred to as E-gas, representing the many blends of ethanol and gasoline being sold now or potentially available in the near future) as the alcohol will absorb the water as it enters the fuel distribution system. Several problems may develop as water enters the fuel system. One such problemcan occur when the alcohol content reaches a water saturation level for the fuel at a specific temperature. If the temperature of the fuel drops (typically due to environmental reasons), the alcohol/water mix will separate and drop to the bottom of the tank. This process is referred to as phase separation. The fuel should not be sold at this point, as the alcohol is one component that supports the octane rating of the fuel and the octane rating is lowered if phase separation occurs. This new liquid, the phase separated fuel, is typically more corrosive than normal alcohol/gasoline fuel mix. This new liquid also has the alcohol and water to supply the nutrients needed to support rapid microbial growth. One byproduct of microbial growth is acetic acid, a corrosive fluid that is harmful to the fuel delivery equipment, vehicle fueling equipment and motor components.

Similarly, diesel fuel is now blended with biodiesel. Biofuels also absorb water. This water in biodiesel also supports rapid microbial growth, the acetic acid byproduct of the microbes, and the resulting aggressive corrosion.

The reduction of sulfur in fuels today is yet another factor in the acidification of the tank ullage and fuel higher concentrations of sulfur inhibited the growth of bacteria in the fuels.

One action that brings water into the tanks storing fuel is the act of dispensing the fuel from the tank. As the fuel leaves the tank, a low(er) pressure area is established in the tank as fuel leaves and ambient air from the outside flows into the tank. This air vapor has moisture, the moisture condenses on the (inside) tank surfaces. The condensed water vapor provides a wetted surface on the exposed portion of the tank known as the ullage or headspace of the tank. The water and oxygen provide an ideal environment for bacteria to grow.

As more fuel leaves the tank more air is drawn into the tank. More air brings more water vapor and therefore more condensation is deposited on the exposed portion of the tank. At some point this water begins to drip from the top of the tank and run down the sides of the tank into the fuel thus encouraging and feeding the growth of bacteria in the fuel.

Another action that encourages condensation in a tank is one that is exposed to, or at least partially exposed to wide temperature changes such as aboveground storage tanks or tanks that are only partially buried and aboveground storage tanks that are encased in concrete. In these cases, the tank is heated during the warmer periods of the day and by exposure to the sun, the tanks are also exposed to a greater cooling effect during storms, rain, snow and at night. These events create large temperature differentials, therefore pressure differentials to expel vapor and ingest moisture.

Another action where water enters the tank system is when rain water percolates through the ground or when ground water covers the top of the tank. Water entry into the tank may occur through holes in the tank, bungs and fittings that allow equipment to be installed or to provide access tier inspections, fueling, etc. Water absorption can be eliminated or reduced by padding tank vapor space with an inert gas such as argon or Nitrogen.

There is a current and growing need to protect this infrastructure from degradation due to corrosion. While there is more than one corrosion issue concerning fuel tanks, one issue includes a broad range of *Acetobacter* microbes are growing in the ullage (empty space) of underground storage tanks and one byproduct of this microbial growth is acetic acid. There are several problems that this acid directly and indirectly cause including; small particles of rust which interfere with fuel delivery by clogging filters and wearing sensitive meter vanes and gears, to destroying the structural integrity of tanks, sumps, impact valves, and other service station equipment, including the metal conduit bringing sensors and power to and from the tank.

One solution, keeping the ullage dry and reducing or eliminating oxygen in this empty portion of a tank, will significantly reduce or stop the acidification of the tank ullage and the sensors and equipment attached to this portion to the tank system. At present, while there are tanks that store water reactive chemicals such as hydrides and borohydrides, and other liquids such as transformer oil that isolate their content from moist (humid) air with dry inert gas, there are no environmental control systems using Nitrogen or other inert gas designed specifically to meet the needs of commercial retail gasoline and diesel dispensing fuel systems, to control the environment of the ullage in small and medium sized tanks at retail and other commercial sites.

There are inert gas blanketing systems designed for refineries, bulk storage and transfer terminals. These large gasoline and diesel above and below ground, high and low pressure fuel storage tanks use inert gas blanketing systems.

Inert padding protects against contamination, accidental ignition, and exposure to airborne toxic vapor. There are inert gas blanketing systems designed for refineries, bulk storage, airport terminals, and transfer terminals. The API 2000 protocols are found in refineries, pipeline terminals and airports worldwide and serve to prevent internal tank corrosion and as a safety blanket that reduces the possibility of explosion of the contained hydrocarbons.

As mentioned, there are small tanks that store chemicals and oils that need to be isolated from the atmosphere, and there are commercial means of protecting those tanks, but at present, there are no ullage (empty space atmosphere) environmental control systems using Nitrogen or inert gas blanketing design principals for low pressure, small and medium size storage tanks typically used and in service to store and dispense gasoline or Ultra Low Sulfur diesel fuels (ULSD).

It is therefore an object of the present invention to provide a gas blanketing system for small and medium storage tanks.

It is another object of the present invention to provide a controlled self-contained blanketed system for sites dispensing hydrocarbons fuels.

It is another object of the present invention to provide a controlled self-contained blanketed system which includes blanket gas application and dispensation.

It is another object of the present invention to provide a controlled self-contained blanketed system which includes blanket gas generation, application and dispensation.

It is yet another object of the present invention to provide a system to generate and dispense a blanketing gas along with provision of blanketing gas in the ullage of a hydrocarbon tank.

It is yet another object of the present invention to provide a system to generate and dispense a blanketing gas along with provision of blanketing gas in the ullage of a hydrocarbon tank and in combination, sumps and conduit connections to equipment connected to the ullage or in tank sumps.

It is yet another object of the present invention to provide a system to disburse a blanketing gas along with a volatile corrosion inhibitor, an anti-fungal or anti-biological into the and/or interstice of a hydrocarbon tank.

It is therefore an object of the present invention to provide a method for coating various surfaces in storage and delivery system.

It is another object of the present invention to provide a system for proper dispersant of anti-fungals or anti-biologicals in a fuel system.

It is still yet another object of the present invention to measure and maintain system integrity in a pressure controlled blanket gas system.

It is still yet another object of the present invention to measure and maintain system integrity in a pressure controlled blanket gas system including the annular space, or interstice, of to secondarily contained storage tank.

It is still yet another object of the present invention to prevent moist air vapor from being introduced into the ullage of a storage tank.

It is still yet another object of the present invention to prevent moist air vapor from being introduced into the annular space of a storage tank.

It is as yet another object of the present invention to control and/or prevent unwanted release of hydrocarbon vapor from tanks.

It is still another object of the present invention to deter and/or prevent the growth of oxygen and water dependent biologicals in the ullage of a tank.

It is still another object of the present invention to deter and/or prevent corrosion of tank walls, metal pieces in the ullage of the tank including bungs, pumps, the conduit connecting electrical devices and sensors, and the monitoring and release prevention equipment.

SUMMARY OF INVENTION

The present invention provides an apparatus for protecting surface deterioration and or corrosion in a small or medium sized underground fuel storage tank system. In one embodiment, a Nitrogen gas generator supplies a source of pressurized N2. The source is coupled with the tank system via a conduit for interconnecting with the ullage. The conduit may also be connected with an annular compartment (or interstice) providing a secondary containment about the fuel storage tank. A valve may be used to control flow of Nitrogen through the conduit into the ullage. A vent system is attached over the tank, and may be coupled with the ullage. The vent may include a pressure vacuum valve controlling the pressure, negative or positive, in the fuel storage tank separate from ambient atmospheric pressure (above-ground). The vent provides for exhausting from the ullage when pressures rise, including venting the Nitrogen from the ullage.

The apparatus may include a controller tor monitoring and controlling release of Nitrogen gas into tank system. A monitor may be used to test the pressure within the fuel storage tank. The monitor may also include a relay system to send information regarding the pressure in the fuel storage tank to said controller. The apparatus may include a programmable system programmed to respond to drops in pressure in the tank, and to cause a supply of a determined amount of Nitrogen gas into the tank to stabilize pressure within the tank. The programmable system may be used to control Nitrogen fill into the tank ullage to achieve a predetermined pressure in said tank within a range of one-tenth inch water column. Optionally, a Nitrogen dispensation hose may be coupled with the source for optional direct dispensation of Nitrogen gas from the generator or the source.

Volatile Corrosion Inhibitors (VCIs) may be provided along with the Nitrogen gas. The VCIs are provided form a source coupled in fluid communication with the conduit, whereby VCIs may be drawn to join with the Nitrogen gas into the ullage.

The apparatus may make used of a specialized N2 multiport coupling coupled with the conduit and the vent. The N2 multi-port coupling may be adapted to reduce turbulence of incoming Nitrogen gas into the fuel storage tank.

The present invention also includes a method of detecting leaks in an underground fuel storage tank. The ullage space of the storage tank will be pressurized to a set level. The pressure will be monitored and/or tested. When fuel is dispensed from the tank, and the pressure within the tank drops, the tank may be sealed from incoming ambient air and repressurized from a source of inert gas. The system may monitor the amount of fuel dispensed, and provide the acceptable amount of inert gas to repressurize to the set pressure level. Dry gas may be forced into the storage tank ullage to dry the ullage space. VCIs may be forced into the ullage along with the inert gas.

The method will include a monitor to determine is the predetermined amount of replacement inert gas meets the expected amount to properly repressurize the tank. The amount required to reach the set pressure level in the tank will then be calculated to determine if the amount of inert gas required to pressurize the ullage space coincides with a predicted amount of gas based on the amount of fuel dispensed. If there is a discrepancy, the system will alert of a potential leak if the amount of gas determined to repressurize the ullage space exceeds the calculated amount. The step of monitoring, may detect the timing and proportion of the topping off events. Preferably, the system may detect a leak within a range of $\frac{1}{10}$" water column pressure.

The present invention provides an apparatus for protecting deterioration of an underground fuel storage tank, and all surfaces therein. A source of compressed inert gas is provided to the tank system along a conduit in fluid communication with an interstice of the fuel storage tank. Preferably, the conduit is the same electrical conduit that houses the electrical power supply wires for powering the pump. The conduit may include a flex line for connecting to the interstice through a pump head. A valve may be coupled between the conduit source and the interstice for directing fluid flow from the interstice to the tank ullage. A pressure vacuum valve will be coupled to the ullage for controlling the pressure, negative or positive, in a tank separate from ambient atmospheric pressure. The pressure vacuum valve will be coupled on a vent for exhausting gases within the tank.

A first needle valve may control the flow of inert gas into the interstice, and a second needle valve may control the flow of gas out the interstice (while preferably directing the excess flow to the ullage). The path out of the interstice may run along an uptake tube that is provided at (or within an inch or inches of) a low point in the interstice. The tube may be coupled with the second needle valve to provide a pathway for gas to exit interstice. Gas may exit first past the second needle valve. Otherwise, gas may pass through the needle valve, and then onto the ullage. Preferably, the second needle valve provides for a redirect of exiting gas from the interstice to the vent. The vent being connected to the ullage, thereby the ullage is provided with a flow of inert gas. Similarly, the inert gas may be coupled with VCIs to provide as constant flow of inert gas, along with VCIs through the system.

BRIEF DESCRIPTION OF THE DRAWINGS

The present invention will be described with greater specificity and clarity with reference to the following drawings, in which.

DETAILED DESCRIPTION OF THE PRESENT INVENTION

Figure 1:
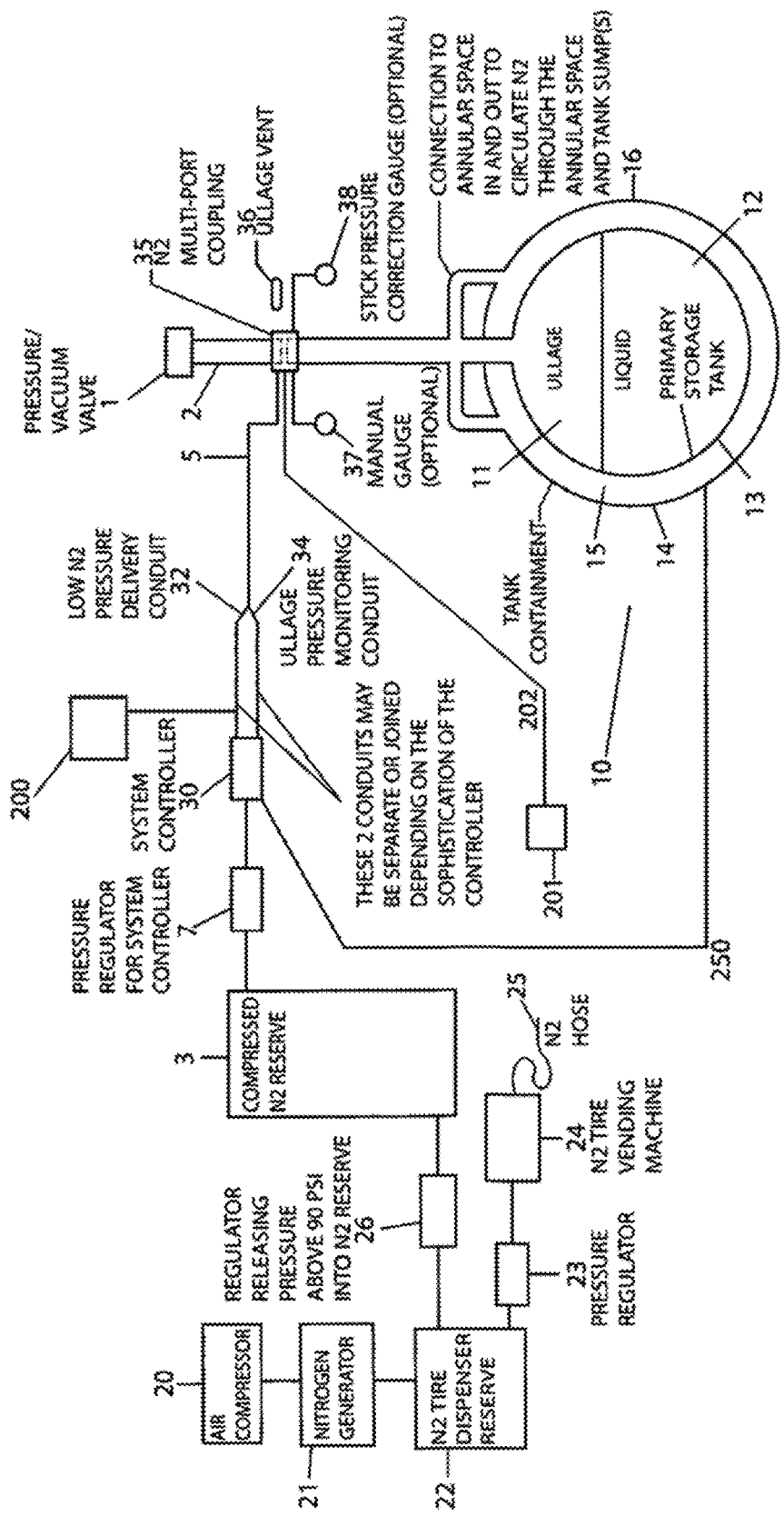
FIG. 1 illustrates a schematic of a tank system and supply of nitrogen gas of an embodiment of the present invention.

The invention may be utilized by modifying prior systems, or by creation of the system in its most preferred form.

It would be beneficial to continuously monitor the tightness of the tank fir potential leaks from the entry points described in the tank top.

As mentioned, one byproduct of the moisture and oxygen and the bacteria and the hydrocarbons is acetic acid, the headspace of the tank itself is acidified. This acidified vapor becomes pressurized (the whole headspace of the tank is pressurized) during the delivery of fuel into the tank. This pressure tries to return through intended venting methods but also is forced out through any opening available including threads, gasketed manways opening that is not effectively sealed to the pressure differential between the tank into the sump(s).

The initial test requirement stimulus for inert gas Nitrogen blanketing is to prove or disprove a positive effect environmental control to prevent acidic atmosphere and its corrosive effects, on the design integrity of ULSD fuel storage tanks, their connected fittings and components.

One benefit mentioned when inerting of the headspace of a fuel storage tank is to reduce the chance of a flash fire, such as those that regularly occur in these tanks due to lightning strikes to the vents or other metallic connections to the headspace of the tank or from static discharge from fueling or filling that be in communication with the head space of a tank, both of these are known and identified problems in this industry.

The initial test stimulus for inert gas blanketing is to prove or disprove an environmental control to prevent the acidic ullage atmosphere and its corrosive effects on the design integrity of fuel storage tanks, their connected fittings and components.

As more onboard refueling vapor recovery (ORVR) equipped vehicles fuel in regulated vapor recovery attainment regions, the Phase II vapor recovery systems are adversely impacted as the ORVR equipment does not return vapor from the vehicle as the previous generation of Phase II equipment was designed for. As the matrix of ORVR equipped vehicles increase, vapor recovery function to prevent the release of hydrocarbon has been affected and vapor recovery fail alarms have increased. This has caused great frustration for fueling station owners as downtime do to the alarms and test costs mandated by the alarms have greatly increased.

Efforts to control excess and fugitive hydrocarbon emissions through the existing vapor recovery systems may become less efficient depending on what ORVR Equipped Vehicle Fueling Matrix was used during the permitting, system design, and fuel site construction. Some fueling site operators are realizing fuel loss and excess emissions particularly due to tank empty space pressure fluctuations overwhelming existing vapor control equipment design parameters.

Another benefit to introducing Nitrogen only into the ullage is as it is lighter that most hydrocarbons, Nitrogen is vented first during any tank refueling. This reduces the amount of vaporized fuel lost to the tank owner. This economic value is greater the higher the volume of product sold or transferred each day. While Nitrogen, or Nitrogen gas $N_2$, is most preferably used, inert gases, such as argon, and others, as well as dry natural gas, may be used to inert or blanket the ullage and other spaces in the tank system. While the description lists Nitrogen as the primary gas, any gas known for its properties to impact the spaces within the tanks system known, or as may be developed, may be useful with the present invention.

This transfer of Nitrogen during refueling of the tank is also beneficial to public transportation as the return tanker truck is no longer filled just with explosive vapor, but reduced fuel vapor and reduced oxygen content providing a safer transport for the driver and the public.

Another benefit to introducing a pressurized inert gas into the ullage is to reduce the amount of fuel that vaporizes. Any pressure on the fuel reduces the amount vaporization that occurs, and will significantly reduce the vaporization of fuels that are currently kept in a lower pressure system and specifically those tank systems that have vacuum on the tank system.

Another benefit to introducing an inert gas into the ullage system is to reduce the oxygen content in the ullage. Oxygen being one of the components that many bacteria that produce acids need to reproduce.

A benefit to blanketing the tank top with Nitrogen is that the Nitrogen molecule is larger than some hydrocarbon molecules and other air molecules, as well as lighter than some, so that the Nitrogen may not pass through some of the smallest openings in the tank top. If the Nitrogen was not present, hydrocarbon molecules would pass through the same openings causing ground or air pollution.

Another aspect of the present invention is to provide the dry inert gas to the interstitial space of double wall tanks. The interstitial area is a place that moisture accumulates. Flowing dry inert gas can remove existing moisture and preventing the accumulation of new moisture. The ability to reduce or eliminate the oxygen content in the interstitial space of double wall tanks, to prevent or halt bacteria growth. This can be accomplished by periodic flushing, or via constant flow to draw or force out air molecules.

The effect of a successful application of these standards is to collect a sufficient amount of reliable and pertinent data to see if Nitrogen blanketing of a storage tanks empty space with an inert gas will inhibit and or prevent the formation of acidic acid in some tanks holding, storing and dispensing fuel. We actually have data from two tanks to confirm this specific to N2 and several studies that specifically tie water, water vapor, fuel and oxygen to producing acids.

The reduction of rust particles in the tank fuel means the rust will no longer be picked up by the submersible pump, wearing pump components, pushing the rust into dispenser meters, reducing wear to meters and reducing the need to change clogged filters as often. Currently, as fuel is being delivered, the rust is moved by the fuel, the rust particles typically accumulate together due to the flow pattern repeating from the fuel drops. The rust particles provide a weighted area for bacteria to colonize and slime, making the colony better able to protect themselves from biocides.

Typically, retail tanks stare routine and custom blends of diesel and biodiesel, gasoline and ethanol, and other commercial liquid hydrocarbon fuels. Additionally, these talks are usually 50,000 gallon capacity or less, low pressure, and may be installed above or below ground. Benefits of inerting fuel tanks with Nitrogen are well known in the prior art.

As such, the present invention includes:
1. Air compressor produces the pressurized air needed for the Nitrogen generator.
2. The compressed air reserve tank reduces the need for the air compressor to run continuously, saving electricity, etc. Compressed air from the compressed air reserve tank is cooled and filtered prior to use with the Nitrogen generator.
3. Nitrogen generator(s) functions to separate Nitrogen under pressure from atmosphere. Compressed Nitrogen generated by the Nitrogen generator is on demand or continuous to maintain a volume of compressed Nitrogen at a set and determined pressure in the Nitrogen reserve storage tank.
4. The pressurized Nitrogen reserve tank's primary function is to hold a sufficient volume of inert Nitrogen gas that provides the N2 needed, in combination with the N2 generated during high demand times, to continuously blanket, at a determined pressure, the empty spaces of associated fuel storage tanks. The pressurized Nitrogen reserve tank(s) can also provide sufficient volumes of inert Nitrogen gas to:

Continuously inert associated fuel storage tank interstitial spaces via separate conduit, and potential additional venting of interstice.
  B. On a select or programmed schedule, leak test associated tank ullage or bead space (C.A.R.B.TP-201, ST-27, ST-30, VMI-10).
  C. Provide an adequate volume of sufficiently pure Nitrogen for scheduled and unscheduled third party testing of associated or unassociated fuel storage tanks (C.A.R.B. TP-201, ST-27, ST-30, VMI-10)
  D. Provide adequate volumes at sufficient pressure to enable vending of Nitrogen, e.g. allowing motorists to check and inflate tires with Nitrogen (preferably providing least 80 PSI).
5. Nitrogen vending. Vending of excess inert Nitrogen gas provides additional site retail or equipment reimbursement revenue streams.
6. The NRS Controller is responsible for detecting fuel movement and adding Nitrogen to replace the fuel. The controller is also responsible for bead space or ullage testing if testing is desired or required at the site. The controller gives notification if there is a failure of the Nitrogen generator to deliver Nitrogen.

In addition to serving a blanketing gas protection agent in the ullage (and/or interstice of a tank), the present invention may also be used as a deployment of volatile corrosion inhibitor (VCI), anti-fungals or anti-biologicals, or anti-corrosion such as via gas, fog, etc. into the ullage, interstice, and/or into the primary gasoline delivery lines of a retail station, or the like.

One common set of materials used to coat fuel (particularly hydrocarbon based) tanks includes ZERUST product provided by Northern Technologies International Corporation of Circle Pines, Minnesota VCIs may be infused into a stable base material—like polyethylene (plastic) sheets or injected into the ground under a tank bottom. When deployed, VCIs are released from the base/delivery material and a molecular layer of VCI is deposited on the surface of the metal to be protected. VCIs act in one of the following ways—or a combination of these mechanisms depending on the application: 1. Barrier Film: Where the molecular layer prevents corrosive elements from reaching the metal. In some cases, this may also be in the form of a passivation film. 2. pH Altering: Where the VCI molecules alter the pH of the layer in contact with the metal and prevent corrosion 3. Scavenging: Where the VCI molecules react with the corrosive elements in the environment and convert them into neutral compounds.

VCI products prevent corrosion in several ways. By acting as a protective barrier from external dirt and abrasion, and also as a barrier to help block the diffusion of corrosive acid gas pollutants from outside the packaging material (such as sulfur dioxide or hydrogen sulfide)—thereby preventing, contact of these corrosive gases with enclosed metal surfaces. By vapor corrosion inhibitors that passivate the electron flow between the anodic and cathodic areas on metal surfaces and interrupt the electro-chemical corrosion process. By adding water repulsion properties to the metal surface, which inhibit water from permeating the metal surface and providing the electrolyte for corrosion reactions. The vapor corrosion inhibitor portion of products is made of proprietary chemical formulations that are invisible, odorless, non-toxic, non-reactive, non-flammable and non-allergenic. These chemical formulations release a corrosion inhibiting vapor that diffuses throughout an enclosure and settles on exposed metal surfaces to form a microscopic corrosion inhibiting layer. VCIs can be water-based rust preventative compounds. They can be designed for use as foggable protection for the inside void spaces of tanks, packages and enclosures. It protects ferrous metals and is multi-metal compatible. VCI foggable aqueous-based rust preventative liquid protects ferrous metals via contact inhibitors. It can also be used as a pressurized spray. VCI molecules migrate to provide protection on even hard to reach areas within an enclosed space.

This protective layer will remain on the surface of the metal as long as there is no significant, continuous exchange of air within the enclosure. Ideally, as was known in the art, there should be less than one air exchange per day (for example, when an electrical cabinet or package is opened briefly and occasionally). Equilibrium with the VCI source is required to maintain the corrosion inhibiting layer, otherwise the layer dissipates from metal surfaces (typically within about an hour). In the present embodiment, the use of VCIs made for long-term storage is adapted to a hydrocarbon storage tank used frequently, such as at a retail fueling station. The supply of VCIs is provided in an automated feedback system to maintain VCI source in the padding, or blanket, above the tank fuel line, and otherwise throughout conduits and along surfaces in the system.

There still exists a need to properly incorporate VCIs in fuel systems. The present invention utilizes a gas blanketing system to disperse a VCI onto surfaces in a fuel system, VCI can be disperses along with an inert or blanketing gas into a tank ullage to provide for coating of system surfaces. By integrating with a blanketing system, the tank and supply lines can be provided with to consistent amount of VCI. In a preferred embodiment, the VCIs will not be under any exceptional pressure and may be drawn during the fueling cycle, or interstice treatment, via Venturi effect. Alternatively, the VCIs may be introduced as needed at one or more particular time or interval. VCIs may be stored in a pressurized container and disbursed in a separate event to deliver a specific amount of VCI, in, such a case, enough pressure and volume would be provided to cause the vent to open, thus coating the entire exposed tank and venting system (preventing rust form forming in the vent).

The system may include a VCI storage/source tied into the controller to open VCI source valves in conjunction with gas blanketing valves to provide for a carrier of VCI (e.g. in fog form) into storage tank. By utilizing the Venturi effect, a non pressurized VCI source can be drawn into the supply line into the tank and mix properly with the blanketing gas to evenly coat the tank Wine and supply lines.

In the alternative, the VCI can be pressurize and introduced with the blanketing gas, or otherwise introduced alone or sprayed onto tank wall. The introduction and application of VCIs may comprise a separate event to deliver a predetermined level of VCI into the system. VCIs may also be sent as a pressurized spray to coat tank and cause the pressure relief system to open in the tank, and thereby force gases out of the ullage and the relief line. By coating the pressure relief line, it prevents rust on the upper portions of the fuel storage system and prevents rust from breaking off and falling back into the fuel.

VCIs also serve to coat and protect sulfur dioxide from diesel exhaust in a vehicle motor to prevent acid (i.e. sulfuric acid) from eating up vehicle tanks and motor system tubing. VCIs can be used on diesel exhaust fluid and used to line tanks on trucks.

The present invention includes a method to efficiently use a pressure system for more than one purpose; where the demands may have different pressure needs; where there are different priorities for the use of the pressure/fluid. The system to produce this method can efficiently store and use pressure/fluid; to use a pumping system to meet more than one demand at the same time.

The present invention includes a method to prioritize the resource (pressure/fluid) to more than one demand given competing priorities; to reduce the number of pumping systems and components; to reduce utility costs by reducing the number of pumping systems by using a larger more efficient pump system; to reduce maintenance costs by reducing the number of pumping systems by using a larger more efficient pump system; and to reduce monitoring costs by reducing the number of pumping systems.

There are three critical points to the NBS system. First, the system should dry the air and remove water vapor from the ullage (interstice, etc.) The preferred system can inject dry air into the ullage as untreated air entering the ullage can cause the problems discussed above. The preferred embodiment of the present invention includes provision of injected dry N2. If moisture is finding a way into the tank independent of the vent (gaskets, fittings not water vapor tight, manways or other loose porous means to enter the ullage) then water can still get into the ullage. Water, along with O2 and moisture, allow *Acetobacter* bacteria to thrive. The concentration of N2 provided reduces or eliminates O2 to reduce bacterial growth. While dry air works. N2, or other inert gas is preferable.

Second, the present invention provides a means for inerting the ullage with at inert gas that will kill, arrest, or suspend the growth of the bacteria, thus preventing acidic liquid to be disbursed in vapor or deposited in the ullage, or joining with other water vapor and depositing moisture to the fuel in the UST/AST. N2 is preferable because it may be inexpensively generated can site. Current solutions in the art include ships using exhaust to clear/blanket ullages. This is done to keep them safe, but this has a side effect of reducing moisture and killing bacteria. An alternative to the Nitrogen embodiment would be the use of pressurized inert gas containers or bottles, the inert gas when blown into the triage lowers the O2 content.

Existing System Equipment Modification

Referring to FIG. 1, pressure/vacuum (p/v) control valve 1 is installed above ground, in the tanks vent pipe or pipes.

The test tanks overall operating positive and or negative empty space pressure is now controlled to stay within the p/v control valve parameters.

A checked low pressure regulated control valve 4 is connected to the exposed tank vent pipe 2, below the tank vent p/v control valve 1. The inert gas line was connected to the checked, low pressure regulated control valve, or below, along the vent pipe (as shown). The other end of the inert gas line was connected to and fed from a sourced volume of compressed Nitrogen.

Pressure regulator valve 4 is set to allow the flow of an inert Nitrogen gas from delivery tube 5 to enter tank as fuel is dispensed. Fundamental dynamics being a valve sensing a lower pressure connected to the headspace of a tank storing fuels and delivering Nitrogen accordingly. Headspace control positive pressure set as low as 0.1 inch of water column being sufficient, as the tank discharges fuel and liquid level drops, the pressure drops and Nitrogen is added. As the tank is (re)filled with the hydrocarbon fuel, the pressure rises, Nitrogen exits through a preset vent p/v valve.

Retail gas stations are not equipped with blanket gas systems due to the irregular fuel dispensation throughout the day. A volume of Nitrogen is the inert blanketing gas used to replace the air vapor that is normally pulled into the empty space of the tank when fuel is dispensed, or other physical events that occur that would reduce the pressure in the headspace of the tank and draw in ambient air with water vapor (i.e. humidity, rain, etc.).

For testing, the delivery pressure of the reserve volume was regulated at less than 5 PSI, connected to the low pressure regulated control valve attached to the tank vent riser. 5 PSI is not the absolute value, however the pressure must be high enough to allow sufficient volume to pass through the regulating orifice and the delivery tube 5 given the tube diameter and distance, to keep air vapor from entering the tank, offsetting the drawdown of fuel and or other physical attributes that tight reduce the pressure in the tank. Another consideration is sizing the Nitrogen delivery system to minimize the potential of over-pressurizing the tank 10. The test tank's normal liquid output volume is one factor that allows us to determine the Nitrogen source volume to meet blanketing tank requirements, the number of nozzles that dispense fuel is another. There are other factors that determine the source volume needs.

To test, a copper test strip probe inspected and or set on a predetermined schedule is used as a visualized control. Once tank test equipment is installed the test tanks are allowed to operate normally open to atmosphere for a period of time, say 30 to 90 days. Copper strip visual inspection are used to detect low or high PH values in the test tanks empty spaces. If copper test strips show acidic conditions, the indication of failure to significantly reduce or eliminate the *Acetobacter* bacterial growth will be indicated. Test strip samples will be visually compared to previous test strip samples taken.

A p/v sensing transducer with a narrow sensing range, for example, between 10 inches water column positive and 10 inches water column negative is installed below the test tanks p/v control valve. The p/v sensing transducer signal is in communication with one or more devices that could include one or more proportional valves, one or more non-proportional valves, an event data logger, computational devices, control devices, algorithms, event parameters, response parameters, alarm and notification potentials, communication devices and other devices not noted here.

Existing System Modification (Alternative)

A p/v control valve is installed on the tanks above ground riser vent pipe. The test tanks overall operating positive and or negative empty space pressure is controlled by the p/v control valve installed on the tanks vent riser.

A checked low pressure regulated control valve is connected below the tank vent p/v control valve, to the tanks above ground vent riser and connected (inert gas being fed from) to a sourced reserve volume of compressed Nitrogen. The pressure regulator valve is set to allow the flow of an inert Nitrogen gas to enter tank as fuel is dispensed. Fundamental dynamics being a valve sensing pressure below a valve connected to the head pace of a tank storing fuel and delivering Nitrogen accordingly. Headspace control positive pressure set as low as 0.1 inch of water column being sufficient, as the tank discharges fuel and liquid level drops, the pressure drops and Nitrogen is added; as the tank is filled, the pressure rises, Nitrogen exits through a preset vent p/v valve.

A reserved volume of compressed Nitrogen is the inert blanketing gas used to replace the normally resident atmosphere in the empty space of the tank being tested. For testing the delivery pressure of the reserve volume is regulated at less than 5 PSI connected to the low pressure regulated control valve attached to the tank vent riser. The test tanks normal liquid output volume determines the volume Nitrogen source reserve to meet blanketing tank requirements.

A copper test strip probe inspected and or set on a predetermined schedule is used as a visualized control. Once tank test equipment is installed the test tanks are allowed to operate normally open to atmosphere for 30-90 days. Copper strip visual inspection may or may not confirm low PH values in test tanks empty spaces. Assuming that copper test strips show acidic conditions or anaerobic activity in the test tanks empty space the test strip samples will be visually compared to test strip samples taken during the succeeding 30-90 day periods where the test tanks empty spaces have been blanketed with Nitrogen.

A p/v sensing transducer with a narrow sensing range, for example, between 10 inches water column positive and 10 inches water column negative, is installed below the test tanks p/v control valve. The p/v sensing transducer signal is in communication with one or more devices that could include one or more proportional valves, one or more non-proportional valves, an event data logger, computational devices, control devices, algorithms, event parameters, response parameters, alarm and notification potentials, communication devices and other devices not noted here.

The present invention may include a novel method for detecting leaks. A separate temperature and/or pressure gauge can be mounted or floated into the tank, or set somewhere along the venting system. Pressure readings can be taken from the tank space to determine when blanketing gas should be delivered into the system. On a normal operating daily cycle, temperatures will vary (as with seasons, etc.) and the system must be configured to distinguish changes in temperature/pressure based on environmental factors and operation factors. Multiple dispensations of gasoline may occur throughout the day. As each dispensation event occurs, if the pressure in the tank drops below a preset threshold, N2 will be release by act of the controller into the ullage. A p/v sensing transducer with a narrow sensing range, for example, of between 10 inches water column positive and 10 inches water column negative is installed below the test tanks p/v control valve. The p/v sensing transducer signal is in communication with one or more devices that could include one or more proportional valves, one or more non-proportional valves, an event data logger, computational devices, control devices, algorithms, event parameters, response parameters, alarm and notification potentials, communication devices and other devices not noted here. Data collected provides information that may be viewed in several formats and such date may be analyzed, tested, compared and otherwise used to determine event that include leaks, leak rates, fuel delivery times and other events including pressure events and other seeming non related events such as theft. As fuel leaves the tank, one customer fueling, or even smaller leaks that would allow vapor pressure to leave the tank would trigger N2 to flow into the tank. Testing the ullage of the container for leaks, potential vapor losses (PVA) and water intrusion points can resolve issues of gaskets that slowly deteriorate, threaded connections that are not tightened or sealed correctly, caps not replaced, etc. We set a threshold below the level we wish to maintain at which we begin repressurizing. There are several methods we use to distinguish a fueling event vs a leak. These include the amount, the volume of the pressure drop. This along with a statistical evaluation of our other gathered pressure data allow us to detect leaks, quantify leaks and separate them from fueling events.

When the test tank receives a bulk fuel delivery. It would be expected the p/v valve would open to relieve excess pressure. If other components are working correctly, such as the stage 1 vapor control system, the N2 or saturated hydrocarbon would flow out of the tank and into the transfer truck.

When the test tank dispenses fuel to a customer. As fuel leaves the tank,—one customer fueling, or even smaller leaks that would allow vapor pressure to leave the tank would trigger N2 to Bow into the tank. We set a threshold below the level we wish to maintain at which we begin repressurizing. There are several methods we use to distinguish a fueling event vs. a leak. These include the amount, the volume of the pressure drop. This along with a statistical evaluation of our other gathered pressure data allow us to detect leaks, quantify leaks and separate them from fueling events.

The fuel storage tank has multiple cycles, such as when the tank receives a bulk fuel delivery or refill, or when the test tank dispenses fuel to a customer. At What points the p/v valve cracks venting Nitrogen to atmosphere or triggers recharge ingestion of Nitrogen as designed to inert or blanket test tanks empty space. Some tanks are under low-pressure, while others may be maintained at a different pressure depending on environmental Conditions, use type of tank, etc. For instance, as leak can be detected when (aside from environmental factors) N2 is required to top off the ullage. Additionally, leaks are relatively constant over the usual time needed to evaluate "tightness", fuel sold changes by the number of customers fueling. This can also be used in conjunction with monitoring the volume of hydrocarbon product dispensed to determine the fueling system integrity.

Referring to FIG. 1, Nitrogen may be isolated in the present invention to act as an inert blanketing gas in ullage 11 of tank 10 above liquid fuel 12. Tank inner wall 13 must be kept clean and clear to ensure the tank systems. Interstice 15 is the annular space section between outer wall 14 and tank wall 1:3 forming a secondary containment. Air Compressor 20 feeds Nitrogen Generator 21. The Nitrogen generator may be any of the N2 generators known in the art to isolate Nitrogen gas for collection from a mixed gas. In certain occasions, stored Nitrogen may be substituted for a compressor and a Nitrogen generator.

In one embodiment, the N2 serves a dual function of tank ullage protection and dispensation for use, e.g. at a tire fill. In such a case Nitrogen is directed from the generator to a Dispenser reserve 22. The dispenser reserve may be along the line 50 to the main compressed N2 reservoir 3 (as shown) or may be set apart to accept N2 when pressure in dispensation reservoir is below some threshold. From dispensation, a vending machine 24 is provided behind a pressure regulator. A hose 25 may be supplied, such as for filling tires. Optionally, a regulator releasing pressure above 90 PSI or similar can be placed before N2 compressed reserve to ensure the pressure in reserve is not too high or low.

The preferred embodiment of the N2 main N2 reserve is compressed, preferably above 90 PSI. Down from main reserve is a pressure regulator 7 which leads to a smart system controller 30. The system controller 30 provides for delivery of N2 gas to the hydrocarbon tank 10. The system controller may also include function to monitor and measure the pressure in the tank. The N2 tank delivery line and pressure monitoring line may be the same, or may run on separate lines (for quicker, more accurate and constant pressure monitoring). A primary valve 31 may be included along first conduit 32 to test and monitor the pressure in the tank, and a secondary 33 or additional valves, along secondary conduit 34 may be used to supply N2 to keep up with delivery. Conduits 32 and 34 may be separated or joined, depending n the sophistication of the controller. N2 is provided to the tank through N2 multi-port coupling 35 (provided by Vaporless Manufacturing (VM1)) and forced into the ullage 11. The N2 displaces air within the ullage and rests over the liquid (or solid) fuel. Although ullage may also include hydrocarbon vapor, N2 does not readily mix with hydrocarbon vapor. N2 is generally lighter than hydrocarbon vapor and thus remains at the top of the ullage 11 and up vent pipe 2. Gases displaced may exit via pressure release 1 at the top of tank outlet. Ullage vent 36 is an optional access point that can be permanently installed as a valve access point (for instance, in the N2 multiport coupling, a multi-port (threaded for permanent/semi-permanent) etc.), in both size of ports. The availability of numerous access points in a coupling/block configuration as further shown in FIG. 5-8. This permanently installed access port allows manual gauges, sensors, data loggers easy available access, also samples can be gathered at (his point to determine many things such as N2, O2, Relative Humidity, etc.

It is contemplated that Ns supplied into ullage will be a low pressure, for reasons of restricting turbulence and safety as UST's and AST's are (relatively) low pressure tanks. Keeping the Nitrogen delivery pressure low is suggested to prevent overpressurization of the tank in the event of multiple or cascading failures of safeties (i.e. vents, etc.). There is absolutely no reason the line has to be low pressure, correctly functioning, the system is even faster responding to fuel demands and high volumes with high pressure, even in a low pressure tank. There will be high pressure applications where it will be desirable or even required to use high pressure. It may be preferable to include high pressure N2 in higher pressure tanks, for instance to prevent liquids from turning to a gas/vapor state. It is contemplated that in future tanks with upgraded safety equipment, a high pressure source of Nitrogen may be included. When periodically clearing the interstice, for instance, a high pressure source of N2 may be preferred, and the controller, in such embodiments should be able to set predetermined N2 gas pressure when providing N2 to ullage vs. interstice, etc.

While in some future instances, the pressure/vacuum (p/v) valve may include a one-way check valve (only letting air out as pressure relief), present tank systems are not designed for high pressure (e.g. 5 psi recommended max./burst pressure 7-8 psi.). Current tanks typical of retail systems must be able to vent in the event there is a vacuum, even of a relatively small amount, to avoid crumpling, or even implosion.

Manual Gauge 37 may be optionally be installed a mechanical psi/vacuum gauge as a temporary or permanent fixture in the system. This may be one embodiment of a pressure sensing item to provide information to the controller, and/or be read manually. Stick Pressure Correction Gauge 38 may optionally be included such as a drop tube installed in the UST or AST (underground or aboveground storage tank), and that drop tube may have a seal, that separates the ullage (empty space in tank) from atmospheric pressure, except through the fuel in a column (drop tube) or the atmosphere through the vent which may have a functioning p/v valve. To the extent that the p/v valve holds pressure above or below ambient air pressure, there may be a different fuel level in the drop tube versus the tank. Manual sticking in the drop tube can be reconciled with actual fuel inside the tank, outside of the drop tube, through the use of a gauge to read the pressure differential.

Separate conduit 250 may be used to clear interstice 15. Forced N2 may run along conduit 205 from controller 30 at same or different pressure as used in the blanketing system. Instead of running through coupler 35, interstice provided gas runs directly to interstice (as there is less issue with turbulence. Interstice may be separately vented (potentially with a one-way valve, at interstice vent 16, which may open for occasional, or constant, treatment.

VCI reserve or source 200 may be included in an embodiment of the system. VCI treatment may be managed by the controller. For instance, for ullage treatment, VCIs may be dispersed concurrently with N2 blanketing gas, either at once, always, or at set predetermined intervals of time or N2 blanketing. Additionally, a separate conduit 202 may serve to supply VCIs from a separate VCI source 201 into ullage (either along with N2 gas, or alone). This may be accomplished either from the same source 200, or additional source 201, to coat interstice.

When N2 is placed over the hydrocarbon fuel, the N2 provides pressure to resist incoming air and the associated water vapor. Hydrocarbon is dispensed via submersible pump below liquid level of tank. As pressure in the tank decreasing due to pumping, and the level of hydrocarbon fuel drops, the system controller activates release of N2 gas into ullage, rather than allow low pressure to remain, or in venting of atmospheric air and possible water vapor.

Figure 7:
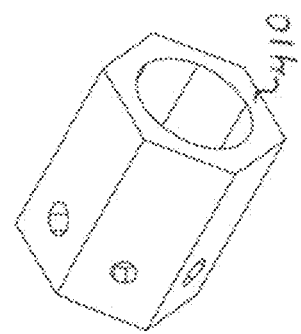
FIG. 7 illustrates a side view of a coupler of an embodiment of the present invention.
Figure 5:
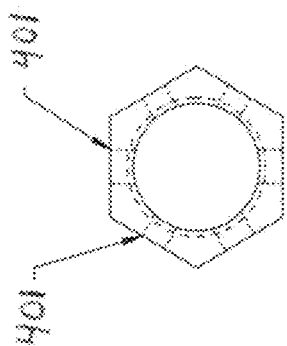
FIG. 5 illustrates a partially see-through cross-sectional side view of a coupler of an embodiment of the present invention.
Figure 6:
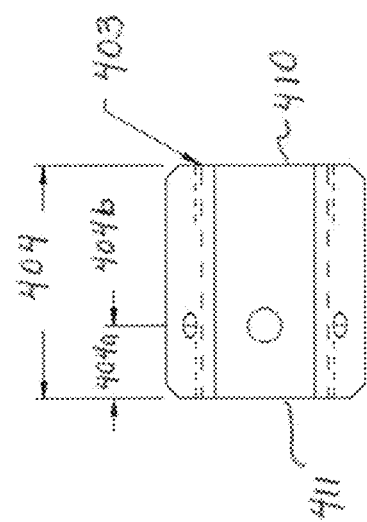
FIG. 6 illustrates a perspective view of a coupler of an embodiment of the present invention.
Figure 8:
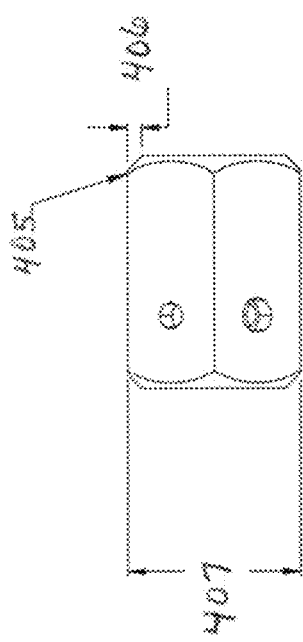
FIG. 8 illustrates a partially see-through cross-sectional top view of a coupler of an embodiment of the present invention.

Referring to FIGS. 5-8, N2 multi-port coupling Nitrogen Connection Coupling VMI coupling is shown in detail Coupling 400 may include multiple openings of different sizes available for any variety of uses. In this case holes 401 are drilled in each of sides 402. Holes 401 are preferably threaded to allow engagement with complimentary threaded conduits (or other items). Coupling as contemplated in the present invention replaces typical couplings of used in the art, as standard couplings are typically too thin to drill and thread to the industry standard for correct number of or depth of threads. Coupler may be hexagonal in cross-section, including six sides 402. The coupling 400 preferred provides specific installed height 404 in the vent. Height 404 may include the height to holes 404 from bottom 410 and to top 411 as space 404a. Coupler furthermore includes cavity or chamber 403 in bottom 410 that assists in the invention, and may be utilized to reduce turbulence of incoming Nitrogen to prevent stirring vapors in the ullage. Cavity walls may be threaded for engagement with the tank system. Coupler may include rounded edge 405 with width 406, as shown in FIG. 8, are flat as shown in FIG. 7. Coupler has width 407.

One advantage of the system includes the system controller ability to test the pressure in the tank. As hydrocarbon is dispensed (e.g. at a fuel pump) the pressure in the tank drops, and N2 goes into replace. If there is a preset condition for pressure within the tank, one can monitor the level and amount of N2 sent to tank. See FIGS. 2-3. After each dispensation event, the system controller will stabilize and repressurize the tank with the N2 gas. The N2 can also carry VCIs, etc. to provide equilibrium of VCIs, etc. to retain protective coating on the system surfaces. When the N2 going into tank is above the amount required to replace the fuel, a leak, or other systematic issue) may be inferred. For instance, if the valves to send N2 open continuously, this may indicate a leak. The volume of dispensed fuel may also be monitored to determine the volume of replacement N2 (given known temperature and pressure). N2 dispensing may be monitored by weight.

Figure 2:
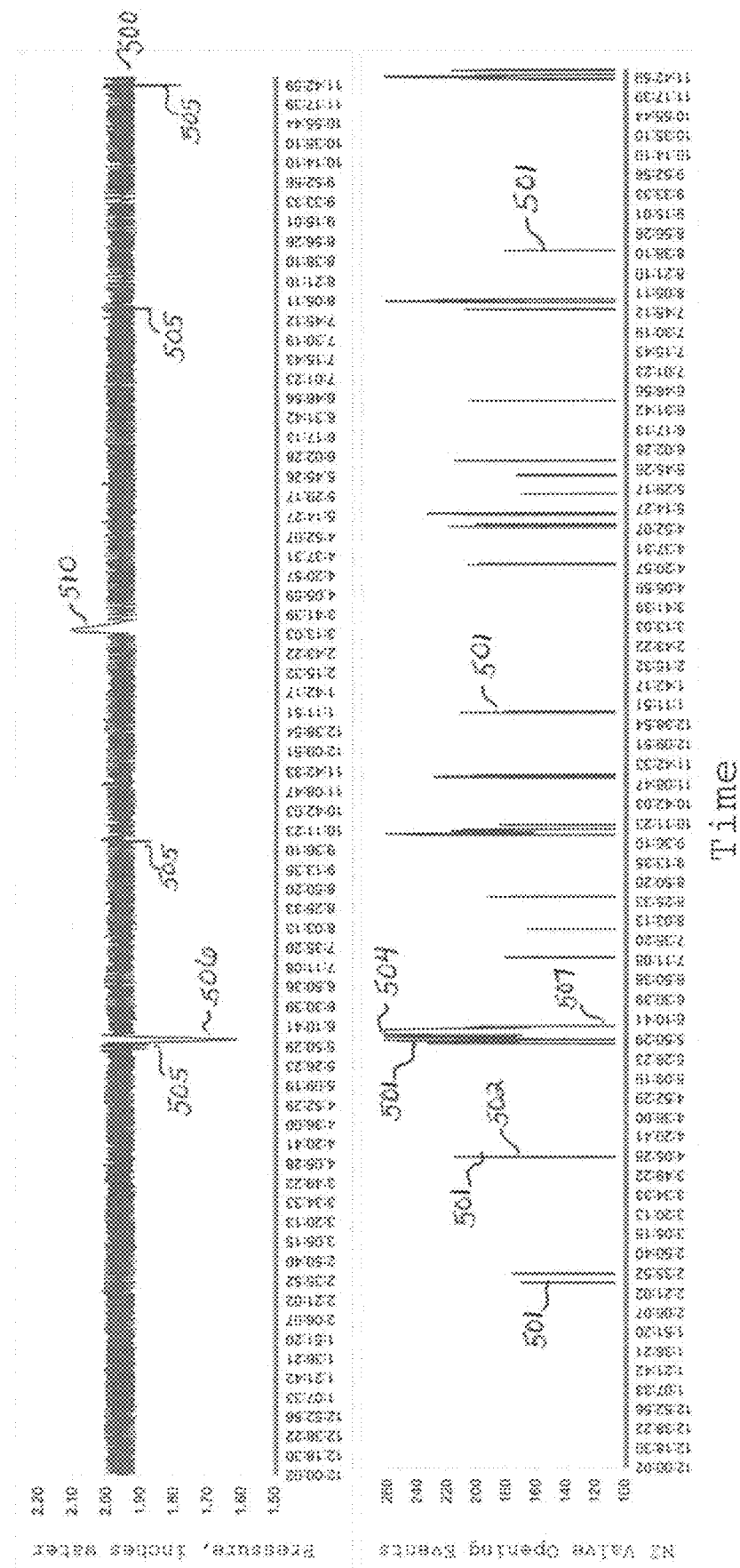
FIG. 2 is a time-graph illustrating pressure readouts and inert gas supply events over twenty-four hours.
Figure 3:
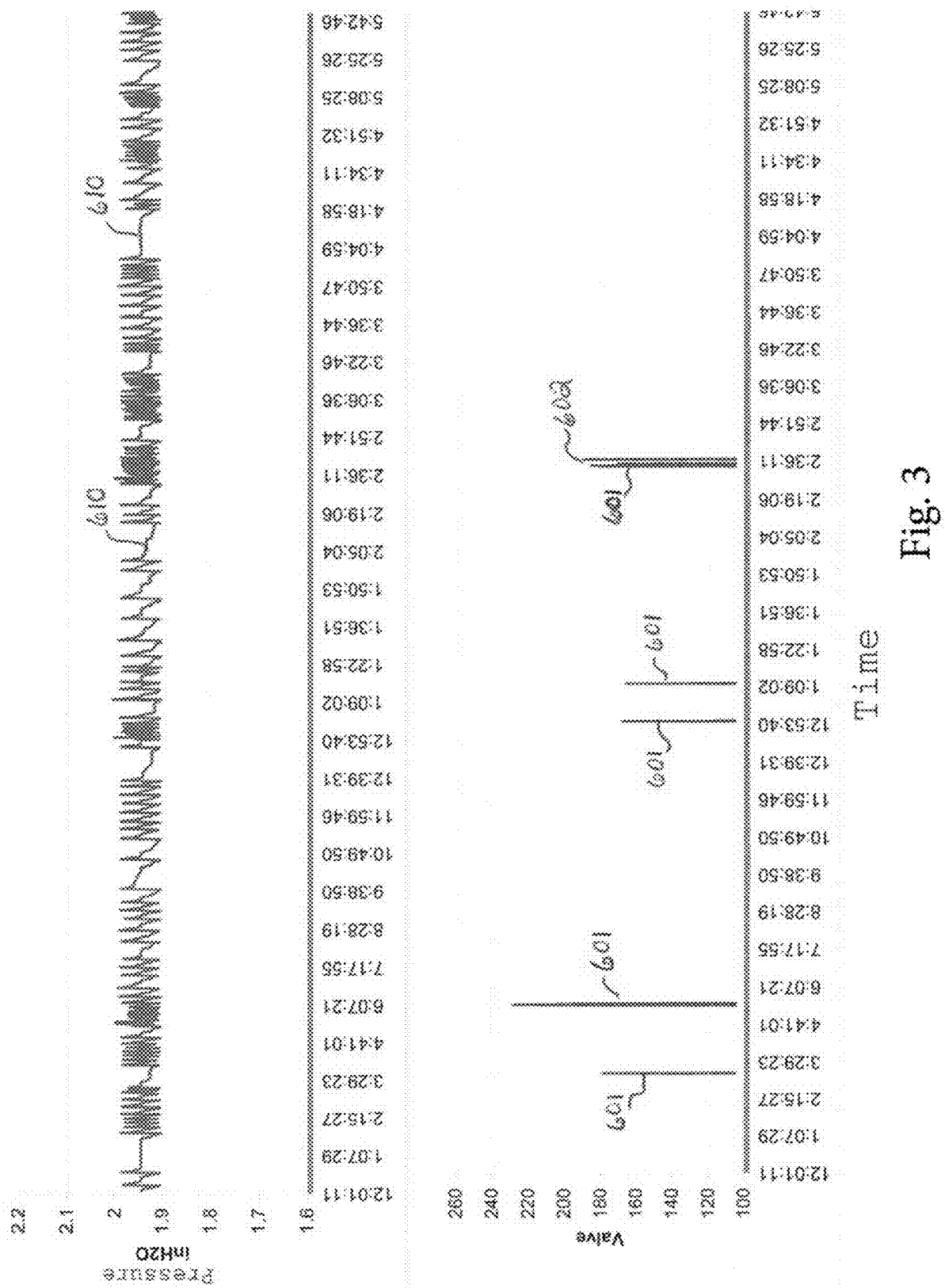
FIG. 3 is a time-graph illustrating pressure readouts and inert gas supply events over twenty-four hours.

As shown in FIGS. 2 and 3, dispensation events over the course of the day demonstrate the working system. Dispensation in a retail fueling or gas station, typically involves opening a nozzle to dispense fuel (e.g. into a truck), and each station may have a single fuel tank tied to multiple nozzles (typically 1-6 nozzles). FIG. 2 demonstrates the fuel dispensations over the course of a da and effect on pressure. FIG. 3 provides a close up of fueling instances, whereby fuel dispensation takes approximately 1.5 to 4 minutes, and repressurization (which may start upon initial fuel dispensation, competes approximately 1 second after fuel finishes dispensing. As the pressure in the tank is measured with a precision monitoring system, the amount of N2 and the integrity of the system can be monitored. Keeping the tank pressure within approximately 2" water column pressure in the tank (1 psi 26.5" water column, 1 atmosphere ~15 psi) the system controller can measure and detect minute pressure differences. Preferably the pressure is maintained between 1,9" and 2" of L water column pressure reading.

As shown in FIG. 2, a 24-hour cycle is shown. Dispensing fuel events will cause the internal tank system pressure to drop. Such drops are met with opening from the inert gas source to refill/repressurize tank with additive inert gas—so as to maintain pressure within a set range, Other conditions or external events, such as daily heating and cooling, barometric atmospheric pressures, etc. may affect tank system pressure. P/V valve is intended to allow breathing out of the tank, while breathing in is preferably substituted with inert gas from source (thus alleviating any issues with ambient water vapor/air entering tank system. Pressure 500 in the tank system is shown as the level of inches in the water column in the top. Pressure is maintained preferably between 1.9 and 2.0 inches of water column pressure. The pressure vacillates many times per minutes based on the random or predictable vibrations and other issues in the system. As seen in the below graphs, fueling from the tank system triggers the inert gas blanketing disbursement through vent opening events 501 (not all events marked with reference numeral). The level of the inert as valve pending is indicated vertically from 100-260. Inert gas system valve is shown closed at 100 (or between events) and fully open at 260. Typical events include fueling of one to four nozzles simultaneously. These relate to valve openings, at double nozzle dispensation event 502 and quadruple 504.

Significant events show that the pressure in the system dropped below 1.9" at least four times during the day. These drops 505 indicate a partial failure of the blanketing system to completely compensate for fueling or other pressure drop events. Specifically, event 506 (around time 5:55) shows a significant drop in the pressure of the system down to 1.6" causing a simultaneous opening of the inert gas valve 507 up to maximum of 260. It is presumed that either the inert gas was enough to overcome this event, or that the p/v vent opened to allow ambient air entry into tank system to restabilize pressure M system. Unusual event 510 indicates an exceptional rise in the pressure around time 330. As yet, this appears to be a thermal/temperature event change causing the pressure to build. Pressure will be released either through p/v valve, or at next dispensation event.

As shown in FIG. 3, approximately a dozen fueling events occurred throughout the day. FIG. 3 represents a tight, or more preferred, system. Particularly, stability events 610 like that around 4:00 demonstrate the stability of the pressure in system between 1.9" and 2". Fueling events 601 represent single or more fueling nozzles open in the system, causing the inert gas to repressurize/compensate. Event 602 likely shows a first fueling nozzle in use, followed by a second fueling nozzle, whereby the first event ends and the second finishes up, a 1-2-1 nozzle opening event. As can be seen above, the N2 inert gas source is able to compensate and maintain the pressure in tank fairly stable throughout the event.

While the pressure changes on the level of 1/10" or 1/300 psi are currently performed, it is foreseen that more precision may be desirable for other thresholds and sensitivities. Current equipment is capable for greater precision. Additionally, the current algorithm used and the current statistical analysis methods allow for greater sensitivity if desirable. It is envisioned that system controllers may measure and monitor up to 1/1000" in water pressure.

The NBS system extends the quality of the fuel, which cart be especially useful in backup generators that are not often filled/refilled. N2 displaces the O2 and H2O in the ullage air to prevent reaction with diesel and other fuels as mentioned above. N2 reduces the evaporation of the fuel, the degradation of the fuel, and prevents damage to the tank and tank equipment.

One additional feature of the present invention is the reduction in petroleum vapor intrusion (PVI). PVI occurs when hydrocarbons from storage tanks leaks into the ground via various holes, openings, or corrosions in the system. As N2 is the lightest material, N2 exists up and out first, including through holes within the tank itself, when ullage is exposed.

The present invention includes generated or provided pressurized source of inert vapor/gas. For example, bottles source of inert gas, combined with a p/v valve on the vent, and a pressure regulator set to release inert gas only between 2-4 inches water column. The p/v valve might hold 6 in. water pressure. When the fuel tank is used (e.g. heating oil, and generators that burn small amounts of fuel each month, and generators for short emergency use), inert gas may be injected into the tank system. Rail cars and other mobile tanks/containers that transfer, carry, contain and load/unload explosive fuels or gasses may also be inerted via the present invention. When emptied, an automatic replacement with an inert gas reduces the potential of railcar explosions High pressure supply of Nitrogen, or other inert gas, can help contain the pressure in these systems to reduce vaporization of liquid fuels.

The present invention also includes method for testing the system for pressure decay—and in turn test for leaks. Oftentimes, the tank is opened for testing and the system is not necessarily completely closed. The continuous use and repressurization of the tank ensures that tank pressure and therefore leaks) are constantly checked for tight seal. One item that is of importance is to distinguish changes in temperature (i.e. daily high/low, hourly, seasonal, etc.) and atmospheric pressure. Given the exactitude of the pressure monitoring system, such items must be taken into account to determine if a drop in system pressure is simply due to temperature drop in tank/ullage.

Figure 4:
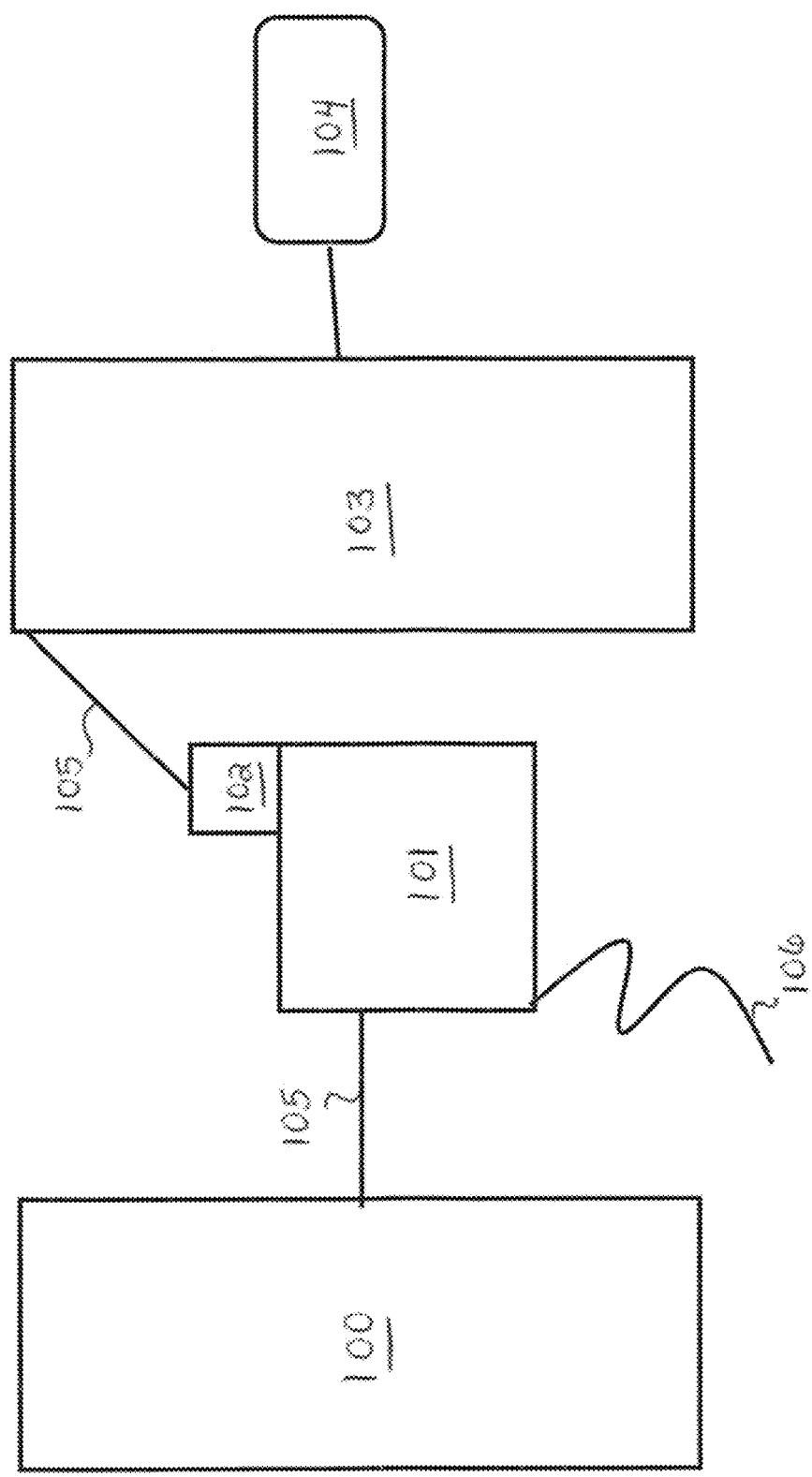
FIG. 4 illustrates a simplified schematic of a nitrogen gas supply of the present invention.

Following is a description of a method that may be used in a pressure delivery system, such as that shown in FIG. 4, that has a Primary function to vend N2 and a Secondary function to fill the tank. The use of this method is for situations where the Primary function of a deliver system is to maintain a mininum pressure volume of a fluid (vaporous or liquid) for a specific function for example filling tires. While seemingly obvious once described, the industry has not used the method for control or configuration.

In this case we will use 100 psi as the minimum pressure needed or the Primary function. There is also a maximum pressure for the Primary Vessel 101, for illustration we will say that is 135 psi. There is a Secondary use or need for the fluid. As long as the Primary vessel 101 maintains the minimum pressure (100 psi), the fluid may be used or diverted from the Primary function to flow into a hose 106, line, or tank to use, control, direct or store the available excess fluid under pressure from the delivery source. In this example, the Secondary function 104 has a use or uses that could utilize the excess fluid/pressure, but does not require the same pressure as the Primary function. The Secondary use may use the excess pressure as it is delivered or it may be stored in a Secondary vessel or vessels.

For instance, the Primary system could require that there be a 5 gallon pressure vessel 101, that maintains at least 100 psi, to fill tires. If this tank falls to 100 PSI (monitored by a pressure sensor), the compressor (part of Source 100, along with compressor, Nitrogen generator) moving air through a Nitrogen generator (also part Source 100), shall be started to keep the Primary vessel 101 at or above 100 psi. This Primary vessel 101 has a valve as a pressure relief or solenoid valve that allows flow from the Nitrogen Generator along conduit 105 into the tank 101, and out to the tire filling equipment through hose 106, but does not allow the fluid (Nitrogen) to the Secondary, system 103 or, purpose 104 unless it is determined that the primary vessel 101 is at or above the desired (100 psi) pressure.

The Secondary system may use the Nitrogen (or air, or liquid) that is in excess of the needs of the Primary system. The Secondary system could be used to deliver the excess full operating pressure or may be used to deliver to a need or purpose that is less than the full operating pressure of the Primary purpose. For example, the Nitrogen used for filling tires may also be desirable to use as a blanket on top of fuel or to prevent air from being sucked into the ullage or headspace of a UST('s) or AST('s). This delivery system responds to the pressure in the Primary Tank and the need of the secondary system. As long as pressure is above the minimum 100 psi pressure in the Primary tank, fluid is available to flow into the Secondary tank. As pressure reaches 100 psi in both the Primary and Secondary tank, pressure flows equally into the Primary and Secondary tanks. In this example, when pressure reaches 135 psi in the Primary tank, the flow is stopped.

For efficiency and cost effectiveness the control of the compressor or pump providing pressure to the described system is important. It is important to insure the runtime of equipment does not exceed manufacturer guide lines. The system as described, only responding to pressure, may call for the delivery system to run continuously. For equipment not rated for continuous use, this may lead to system failure due to premature equipment failure. A control system monitoring the run time of the pump/compressor can protect this equipment. The control should be such that the runtime is set to not exceed the equipment parameters or may be variable to be set for runtime to meet equipment that is changed out during the life of the system. Insuring the Primary system needs are met and insuring there is adequate off or quiet time to prevent compressor damage by restricting the secondary use from overriding the needed down or of time for the specific equipment providing pressure.

This type of control means there is special consideration given to insure that equipment run parameters are followed. A compressor that is equipped with pressure responsive controls only responds to the demand of pressure only. This type of setup can cause the equipment to run continuously. Certain compressors are not equipped to run continuously compressor type such as reciprocating, screw, scroll is made to insure the needed pressure/volume to fill the Primary function is then identified, then the compressor cubic feet per minute (CFM) at pressure desired is sized along with the appropriate storage tank size to insure the volume needed for the primary purpose never has the compressor run, for longer than specified by the manufacturer. Other efficiencies such as elevation, equipment and diurnal temperatures need to be included in CFM/pressure calculations. Additionally, the desired volume for the secondary use should be considered; is it important to meet 1-100 percent of the secondary volume required. The available run time to meet this need should be considered, then the volume and pressure sized as well as the required (pressure compensated) storage volume required.

The type of compressor (such as reciprocating, screw, scroll) and speed/volume of compressed air produced is determined by the compressor. For best practices, if the reciprocating compressor should only have a 50% duty cycle and a max run time of 15 minutes, the compressor should only be started when air is called for, or when pressure in one of the reserves is below a set low threshold, but not run for greater than the max run time. For example, the next compressor "start" is triggered when Nitrogen reserve falls below 100 psi. In another embodiment with two Nitrogen reserves, or in an embodiment with a compressed air reserve (for use as compressed air) and at least one Nitrogen reserve, a threshold may be set by each of both or all reserve tanks to trigger the compressor.

Further systems to inert the tank system, particularly to inert the interstice, are shown in FIGS. 9-12. The annular space of a tank is important as it is employed to act as a secondary containment to prevent fuel from polluting the ground or groundwater in the event the primary tank begins to leak, provides leak detection (such as by liquid sensor or air pressure or vacuum) monitoring of the interstice of the tank. In particular, the method illustrated in the new drawing provided allows us to prove the integrity of liquid or air transfer of pressure from one end of the interstice of the tank to the other. Up to this point in time there was no method demonstrated that proved communication from one end of the tank interstice to the other. This is important as the passage ways may be small, they may become clogged by corrosion or during the process of lining a tank. Secondary containment monitoring systems are known in the art, including the system shown and described in U.S. Patent Publication No. 2007/0041789 herein incorporated by reference.

As fuel leaves the tank, weather it is from being sold or transferred, or the tank heats up or cools down due to temperature change of the ambient tank environment, or the temperature of the fuel added to the tank, at some point, the pressure in the ullage of the tank will fall below the atmospheric pressure. When pressure in the tank falls below the pressure outside the tank, the tank wants to draw the outside atmosphere into the ullage of the tank. If the atmosphere drawn into the tank is moist, at some point in time, immediately or when conditions are conducive, the water vapor will condense on the tank and other hard surfaces of equipment in the ullage of the tank and elsewhere in the system. Corrosion may occur, such as via the bacteria (*Acetobacter* and others) that produce acids and other undesirables (biomass or biofilm for example) are commonly present in air, the water, or the fuel in the tank. The bacteria, using the deposited water and oxygen present and foods (ethanol or the fuels themselves in some cases) begin multiplying. The bugs excrement include acids, that can cause or exacerbate corrosion of the tank and equipment in the tank, including unwanted fluids that may be transferred into the sumps on top of the tank. Acidified water may run down the sides of the tank, and or "rains" down into the fuel, acidifying the fuel and pooling acidified water on the bottom of the tank that is detrimental to the tank bottom.

As the Annular space is commonly monitored, the monitor equipment needs to be tested to insure it is still functional within some parameter based upon the technology used, and the regulations covering such equipment. To insure there is no leaking fuel from primary tank into the interstice and/or that there is no leak of the secondary containment that would allow liquid from the outside to enter the interstice makes monitoring this area important. During testing and monitoring, moisture and rain will enter the interstice of the tank, condensing and collecting in the bottom of the interstice. This liquid may accumulate and become enough to set off a "false" alarm as it is not truly a leak out of the primary tank or in through the secondary tank, but instead accumulated condensation.

A. Running dry gasses through the interstice will prevent moist air from entering the interstice B. Running dry gasses through the interstice will absorb and carry this moisture out of this area.

C. Running dry gasses through the interstice at the inlet with a fixed pressure, on a constant volume that is below the equivalent leak rate desirable for monitoring, a comparison between the incoming pressure/volume and the outgoing pressure/volume can detect leaks in the interstice.

Furthermore, it may be preferable to supply inert gas via the electrical conduit power supply lines (typically underground). This conduit piping is often explosion proof, however the matings/joints are not always tapering. The joints, and mating surfaces, allow for water and other contaminants to enter into the conduits. The grounding may be jeopardized and the conduit will eventually rot. When the submersible turbine pump (STP) is initially set up in the tank, with the motor lowered below the fuel line via motor column, the grounding is often utilized through the system, rather than through a ground wire. When a fiberglass (non-conductive) tank is used, the grounding may be insufficient and the pump items act as an anode which can attract contaminants and/or cause corrosion along pump items. When the conduit corrodes, resistance in the conduit or electrical supply lines cause electrical fields and lead to corrosion. This is particularly severe when non-conductive plastic (e.g. PVC) conduits are used to house electrical supply lines.

Figure 9:
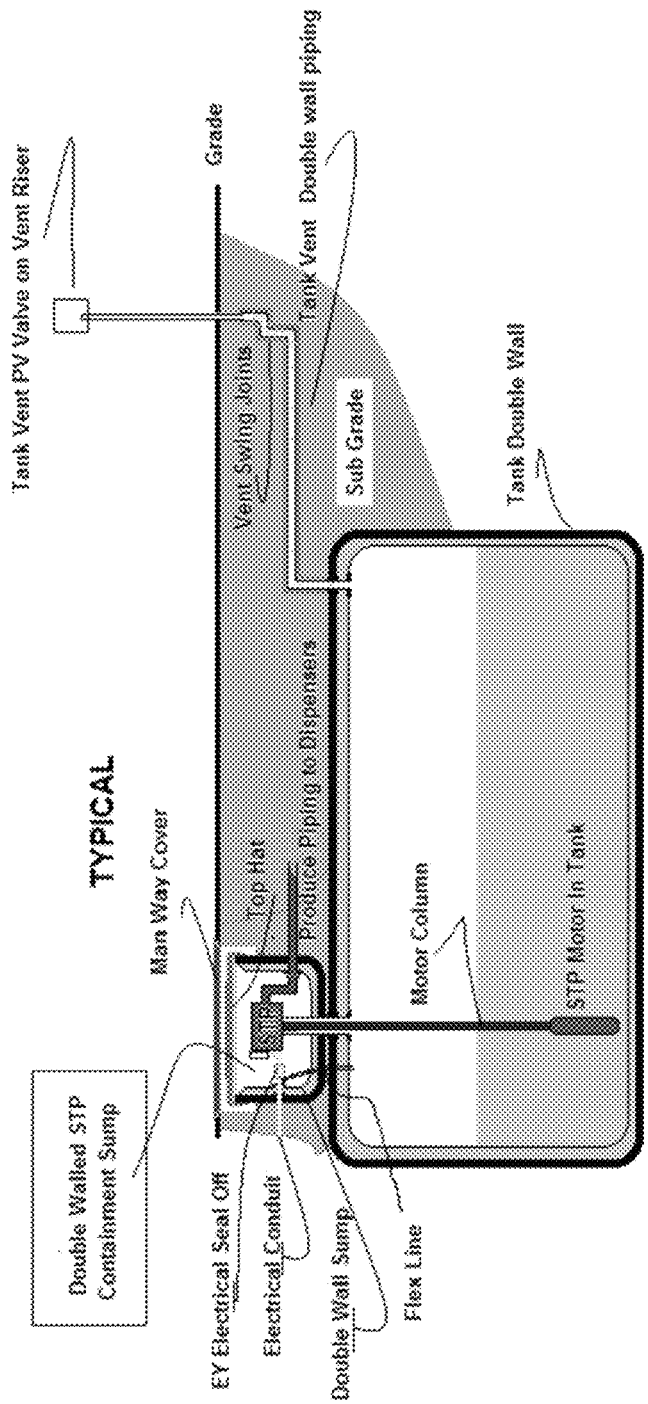
FIG. 9 illustrates a tank schematic of an embodiment of the present invention.

A typical tank is shown in FIG. 9, below grad/ground, with a containment sump for the pump, which is capped with top hat to seal from rain or other entering, bodies. The electrical supply lines may include a flex line off the electrical conduit to supply inert gas along the electrical conduit (from left), wherein the EY seal prevents any gas or vapor from entering conduit. Flex line provides from gas to exit conduit and preferably enter the interstice within tank double wall exterior containment body. Flex line may access tank via pump head tank test port to access ullage. While the ⅜" threaded coupling of test port is often closed, (pended from annual pressurized gas testing), this can be used to access the tank ullage. Alternatively, a separate access point(s) may be used to supply inert gas from electrical conduit to ullage and/or interstice. The inert gas may also be used to fill the ullage. Tank vent line may also be double-walled, as is known in the art, to provide secondary containment of vapors passing/resting therein. A Swing joint may be used with three 90-degree elbows, to allow pivoting, and prevent breakage. While it may be preferred to supply inert gas to the ullage via coupling along the vent line, this electrical conduit supply may be an alternative, or additional source of inert gas. For instance, the electrical conduit line may supply inert gas to the interstice, while the vent lien can be used to pad ullage.

Typically there is only one bung in a secondary annular interstice. The needle valves isolate and, in calibration, maintain at a mien calibrated pressure. This pressure is determined to be a flow rate that is ideal for the particular tank selected. Typical above ground tanks are not perfectly tight.

Figure 10:
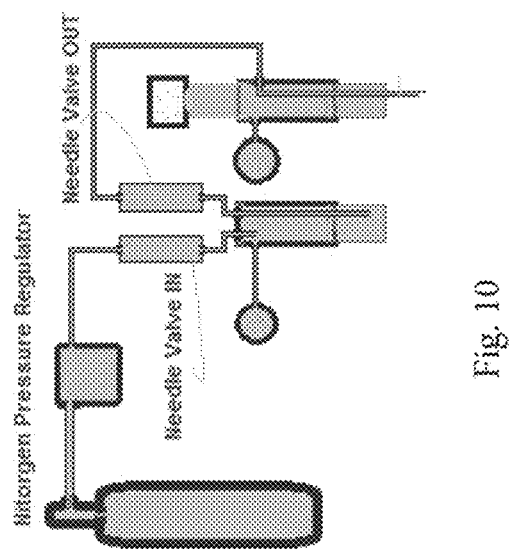
FIG. 10 illustrates a schematic of Nitrogen gas supply system of an embodiment of the present invention.

FIG. 10 shows a cheap system where an extremely low (how low has yet to be determined) flow rate of Nitrogen is being used to monitor and dry a tank compartment(s) atmospheres. Flow rate being disturbed creates an alarm. The differential flow of Nitrogen through and between the two calibrated needle valves is the monitoring theory. There are two ways to monitor flow and pressure, either before entering and In, or In and After. In and thereafter being preferred.

As can be seen in FIG. 10, a method to positively pressurize flush the interstice of the tank and the ullage of the tank on a continuous method is shown. This low tech, low cost method is desirable to prevent moisture from accumulating in these areas commonly found in tanks that sit for long periods of time with low amounts of filet use such as tanks used to store fuel for generators. These tanks accumulate water in the bottom of the tank. This occurs even in tanks that have filtrations systems attached to them. The tanks "breath" due to temperature changes (warming) of the tank/fuel/vent that causes vapor to leave the tanks and atmospheric vapor to be sucked back in to the tank system as the tank/fuel/vent cools. The filtrations systems cannot be located on the bottom of the tank so any distance from the bottom of the pickup tube to the bottom of the tank (often 2 inches) allows water to accumulate on the tank bottom. This water allows/encourages art ideal area for bacteria production. Any bacteria production is not desirable but it is found that this area encourages destructive *Acetobacter* bacteria production, creating acids that destroy tanks and equipment. This method also is desirable to prevent/remove accumulated moisture from the interstice of double wall tanks. A needle valve, as is known in the art, is preferable to control the flow rate of N2 inland out of system. In this system, the same source provides N2 to both the interstice (left) and main tank (right). N2 is first provided to the interstice at the top, while the interstice out is drawn through a tube that dips into the interstice. This tube may drop as low as one inch from the bottom of the interstice. Passed the Needle Valve OUT, the remainder of inert, gas not leaving the system is then supplied into the ullage. Vent is shown as the thick black rectangle at right. Separate supplies (from possible separate sources may also be used for the interstice and the ullage.

Figure 11:
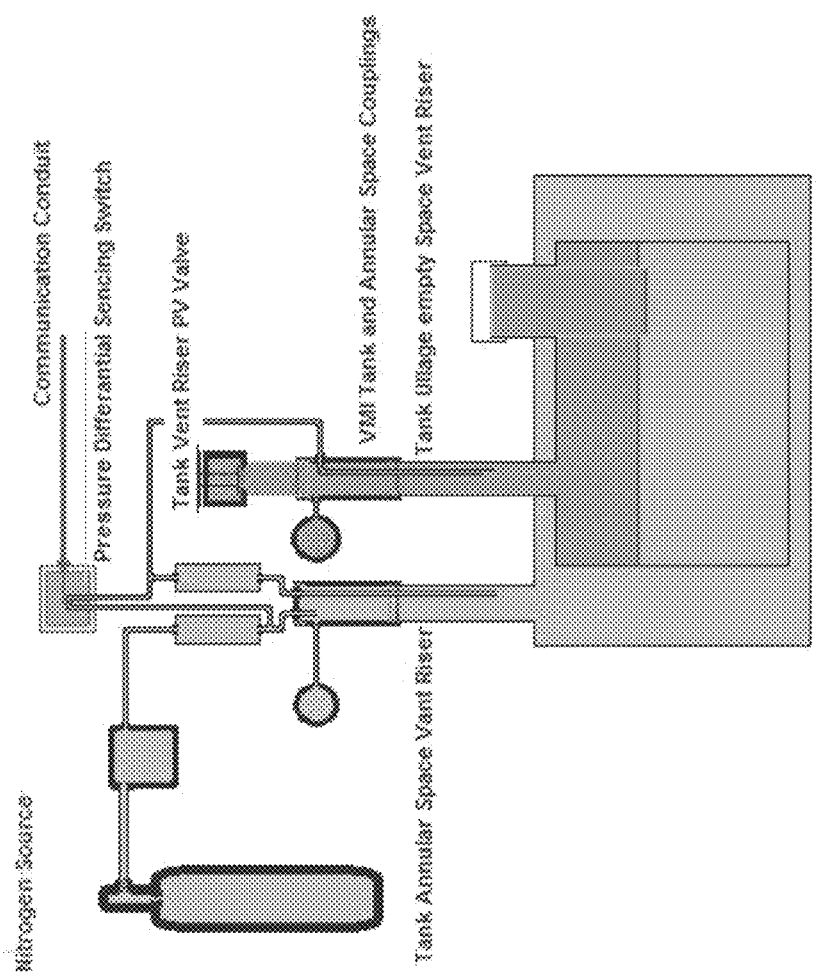
FIG. 11 illustrates a schematic of a tank system of an embodiment of the present invention.

As can be seen in FIG. 11, a method to insure the interstice of the tank has a dry inert gas protecting preventing/removing water vapor and protecting/monitoring the Ullage of the tank with a pressure monitoring system that will Alarm if pressure is not maintained above a determined set point, such as 2" water column. This addition allows remote monitoring to determine if there is a problem with the tank system or the dry, inert air supply. If the interstice fills with a fluid, Such as water, the return line of the N2 will be clogged and prevent flows (given the high pressure required to lift water in tube). Water or hydrocarbons leaking into secondary/interstice may cause clogging to prevent flow to OUT. This will create a further back pressure that cannot be overcome. Leaks of the interstice will not reach the needle valve controlling feed out. Therefore, a small set pressure back flow may be used to check out.

Figure 12:
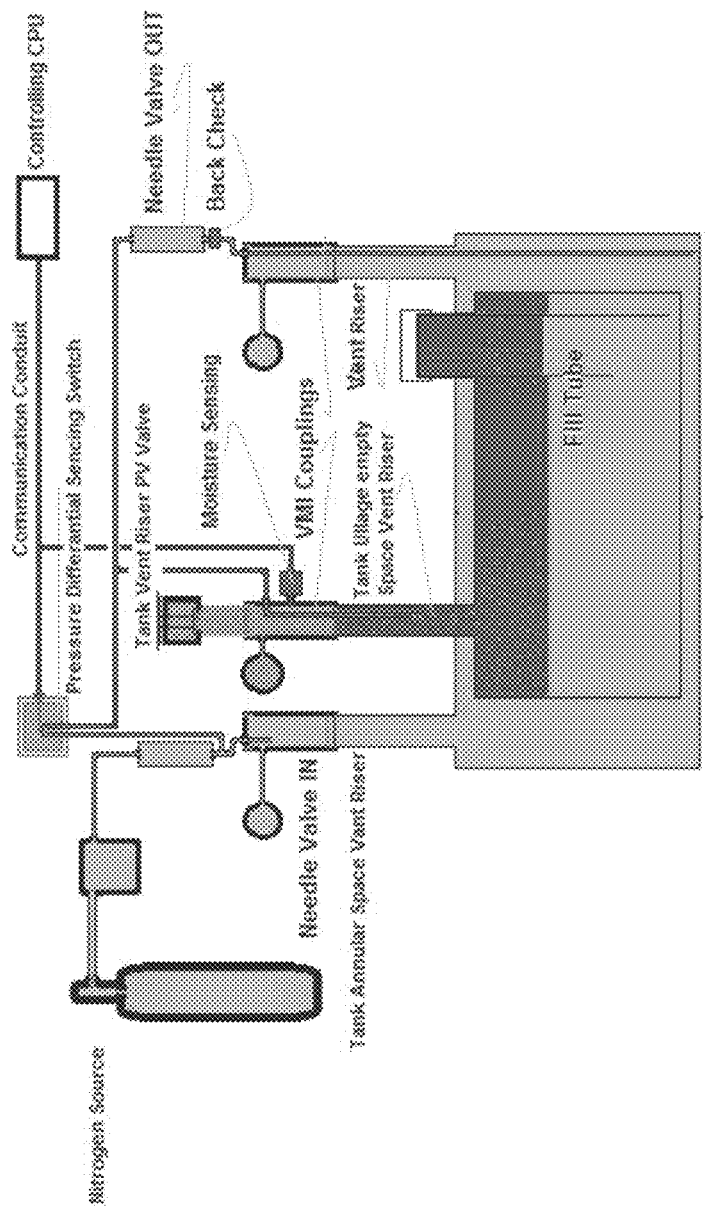
FIG. 12 illustrates a schematic of a tank system of an embodiment of the present invention.

FIG. 12 demonstrates more sophisticated system of inerting both the interstice and ullage. The use of two interstice openings in the tank system encourages the dry inert air to move around the tank exposing the air to more surface area, increasing the drying and moisture removing ability of the air in the tank interstice. This method also provides proof that there is communication around the interstice of the tank. Communication is important as owners and regulators have no means to insure that the close proximity that some tank systems are built with (sometimes something as small as a paper liner providing separation) are not in fact sealed off due to corrosion or bacterial growth. Also, the tube extending down to tank bottom on the exit of the gas from the interstice would effectively create an Alarm with the low pressure the system is designed to work with. If there is a primary tank breach for water accumulation) in the interstice, and the pressure moving through the system is inches of water column say 3 to 4 inches water column, the dry air would not be able to push the liquid out of the tube, providing a pressure switch Alarm of low pressure. Again, if the airflow is okay around the interstice, any leaks in the ullage larger than the air flow injected by the control would also provide an Alarm.

The system described above has a low pressure, say 2 inch water column check valve to isolate the interstice, allowing cubic feet per day to be more easily calibrated at a specific pressure. FIG. 12 also shows an optional water vapor sensor in the tank vent. N2 is supplied through the Needle Valve IN into the interstice, and exit via tubing (at bottom right) through Needle Valve OUT. N2 is supplied dry, while water vapor may be captured/diffused along with N2 to be drawn out of system. Given that tube for outgoing gas from the interstice is towards the lower end of the interstice, if debris or water is left in the system, the gas will not be able to displace/force the water up high enough (as it lacks pressure) to force water though tube. Such a stoppage can be detected by the controller.

Preferably, the supplied flow rate IN will be set at a higher rate than the OUT. This will cause back pressure in the interstice. For instance, flow rate can be set at 10 cubic feet per day (CFD) and the outflow can be set at 3 CFD. While all interstices will have some leak, the leak rate can then be detected by the controller. Excess N2 outflow will be directed to the tank vent riser PV valve. The PV valve will then open on a regular basis due to excess pressure) when the pressure in the ullage rises to the level of PV gas out pressure. The PV valve openings can then be monitored for their regularity (given the known inflow from the interstice OUT) and any subsequent leaks or issues in the system can be monitored via the change in the regular venting of the PV valve in vent. For instance, if the PV valve stops regular openings, this may indicate that the interstice outflow tube is clogged due to debris, water, etc.

This system is continuously pressurizing the tank system with a small volume of inert gas such as N2 provided from a tank or small N2 generator system. The tank interstice and ullage move dry inert air through the system, the pressure valve on top of the vent intermittently opening to allow the air out of the ullage, resetting to close when pressure falls in the ullage of the tank. This cycle continues, pressure builds again in the ullage to the opening of the pressure relief providing an inexpensive protection of the tank interstice, ullage, and any monitoring equipment in the tank. Not only is the tank and tank components protected, the fuel itself benefits from preventing the oxidation that would occur if the tank system was "breathing" air in and out through the vent as would normally occur, providing oxygen to degrade the fuel.

One aspect of the present invention includes a method to introduce Nitrogen from a high or top point in the system, in a controlled, non-turbulent manner. This allows the Nitrogen to blanket the hydrocarbon and reduces mixing of Nitrogen and hydrocarbon.

The embodiments set forth in this application specification are for illustrative purposes alone, and should not be seen to limit the inventions as described and presently claimed. The terms Nitrogen and N2 typically refer to molecular Nitrogen and Nitrogen gas, respectively, however use in this specification may be interchangeable, or refer to Nitrogen in a general sense.

We claim:

1. A method of detecting leaks in an underground fuel storage tank comprising the steps of:
   (a) pressurizing an ullage space of the storage tank to a predetermined pressure level;
   (b) testing the pressure in the ullage space of the storage tank;
   (c) dispensing fuel from the storage tank to drop the pressure within the storage tank;
   (d) monitoring the amount of fuel dispensed in said step of dispensing;
   (e) repressurizing the ullage space of the storage tank to said predetermined pressure level;
   (f) determining an amount of gas required to repressurize the ullage space;
   (g) calculating if the amount of gas required to pressurize the ullage space coincides with a predicted amount of gas based on the amount of fuel dispensed; and
   (h) alerting of a potential leak if the amount of gas determined to repressurize the ullage space exceeds the calculated amount.

2. The method of claim 1 wherein said step of pressurizing and repressurizing are completed using a source of inert gas.

3. The method of claim 1 whereby the step of monitoring detects the timing and proportion of the topping off events, and further including the step of detecting a leak within a range of 1/10" water column.

4. The method of claim 1 further comprising the step of injecting to forces dry gas into the ullage space to dry the ullage space.

5. The method of claim 4 further comprising the step of coating interior surfaces of the storage tank with VCIs.

6. The method of claim 1 whereby said step of pressurizing is conducted via providing a source of Nitrogen gas under pressure through a conduit interconnecting the ullage space and an annular space about the storage tank.

7. The method of claim 6 whereby said step of pressurizing further comprises the step of controlling flow of the Nitrogen gas via a valve to alternately or concurrently supply the Nitrogen gas through the conduit into the ullage space and/or the annular space.

8. The method of claim 7 whereby said step of pressurizing further comprises maintaining pressure within the storage tank via a pressure vacuum valve separate from ambient atmospheric pressure.

9. The method of claim 1 whereby said step of pressurizing comprises controlling release of Nitrogen gas from a pressure vacuum valve via a controller.

10. The method of claim 9 whereby said step of monitoring comprises sending information regarding pressure readings from said step of monitoring to the controller.

11. The method of claim 1 whereby said step of repressurizing comprises programming a controller to respond to drops in pressure in the storage tank; and supplying a predetermined amount of Nitrogen gas into the storage tank to stabilize pressure within the storage tank based on pre-programmed indicated drop sensed in said step of monitoring.

12. The method of claim 1 whereby said step of pressurizing is accomplished through an N2 multi-port coupling coupled with the storage tank via a conduit and a vent to reduce turbulence of incoming Nitrogen gas into the storage tank.

13. The method of claim 9 whereby the controller controls Nitrogen gas flow into said ullage space to achieve a predetermined pressure in the storage tank within a range of one-tenth inch water column.

14. The method of claim 1 whereby the step of monitoring detects pressure changes at least as low as 1/1000 inch water column pressure.

15. The method of claim 1 whereby the predetermined pressure level is set at 1/10 inch water column pressure.

16. The method of claim 1 whereby the predetermined pressure level is set at 2" of water column pressure, and whereby said pressure in the storage tank is maintained between 1.9" and 2" water column pressure.

17. The method of claim 1 whereby the predetermined pressure level is set at 2" of water column pressure, and whereby said pressure in the storage tank is maintained between 2" and 4" water column pressure.

18. The method of claim 1 whereby said step of repressurizing maintains pressure in the storage tank to within 2" of water column pressure from said predetermined pressure level.

19. The method of claim 1 whereby said step of pressurizing is conducted via a pressure transducer set to −10" to +10" water column pressure.

20. The method of claim 6 further comprising the step of coating the annular space with VCIs.

* * * * *